UNITED STATES PATENT OFFICE.

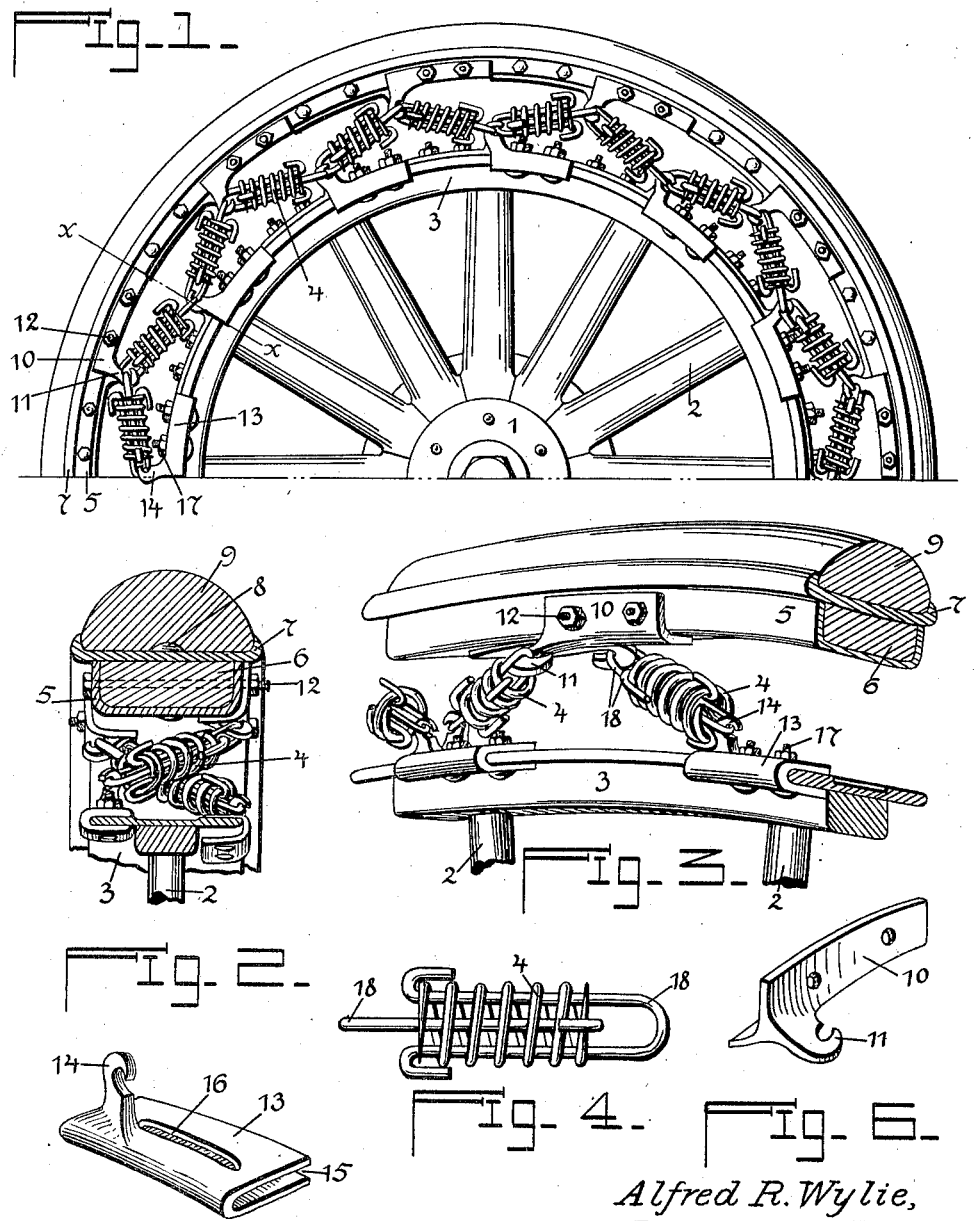

ALFRED R. WYLIE AND JAMES G. WRIGHT, OF BIG SPRING, TEXAS.

VEHICLE-WHEEL.

1,036,770.  Specification of Letters Patent.  Patented Aug. 27, 1912.

Application filed July 20, 1911. Serial No. 639,505.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Vehicle-Wheels, of which the following is a specification.

Our invention relates to new and useful improvements in vehicle wheels, and relates more particularly to a wheel for use on automobiles. Its object is to provide a vehicle wheel having embodied in its construction a plurality of springs, by which the same resilient effect is secured in travel that in the present practice is obtained by the use of pneumatic tires.

The object of the invention is more specifically to provide a vehicle wheel having an inner and an outer rim spaced from each other, the inner rim being rigid with the frame of the wheel, and the outer rim being connected therewith by a plurality of tense coiled springs so arranged as to form a cushion for shocks imparted to the outer rim, and acting either radially or in a direction transverse of the wheel.

Finally the object of the invention is to provide a device of the character described that will be strong, durable, simple and efficient and comparatively easy to construct, and also one the various parts of which will not be likely to get out of working order.

With these and various other objects in view, our invention has relation to certain novel features of the construction and operation, an example of which is described in the following specification and illustrated in the accompanying drawing, wherein:

Figure 1 is a front view, showing half the wheel. Fig. 2 is a detail sectional view taken upon the line *x—x* of Fig. 1, and showing the rim portion of the wheel. Fig. 3 is a perspective view, showing an outer portion of the wheel, including the two rims and the resilient connection between the same. Fig. 4 is a detail perspective view of one of the coiled springs which establish a connection between the two rims of the wheel, showing also the connection employed to attach said springs to suitable brackets carried by the rims. Fig. 5 is a detail perspective view, showing one of the brackets carried by the inner rim to which brackets the springs are secured. Fig. 6 is a detail perspective view, showing one of the brackets carried by the outer rim, to which the outer ends of the springs are secured.

Referring now more particularly to the drawing, wherein like numerals of reference indicate similar parts in all the figures, the numeral 1 denotes the hub, 2 the spokes and 3 the inner rim of the wheel, which parts together form a rigid frame. The outer or floating rim of the wheel is spaced from the inner rim and is resiliently supported in its proper spaced relation to said inner rim by a plurality of coiled springs 4. The outer rim is of a composite construction consisting of parts 5, 6, 7, and 8. The part 5 has the form of an annular metallic channel with its flanges turned outwardly, and a wooden ring 6 mounted between said flanges. A metallic tire 7 encircles the block 6 and is held in place by a plurality of bolts 8, passing through the metallic tire, the wooden block and the channel. The edges of the tire 7 are turned outwardly and are made to slightly overhang the main portion of the tire, thus forming recesses which serve to retain in place an outer tire 9 of solid rubber. The coiled springs 4 are mounted between the two rims with their center lines forming an angle with the curved surfaces of the rim.

Upon the member 5 of the outer rim of the wheel are equidistantly mounted a plurality of brackets 10, each provided with a hook 11. These brackets are given an angular form, which adapts them to embrace the edges of the channel 5 to which they are secured by bolts 12 passing through the flanges of said channel, and through the block 6. The brackets 10 are arranged alternately with relation to the edges of the channel, first upon one edge then upon the other. Upon the inner rim 3 of the wheel are mounted a plurality of brackets 13 each provided with a hook 14, and alternately positioned with relation to the edges of the rim similar to the brackets already described. The brackets 13 have an elongated U-shape in cross section, a groove 15 being formed by this construction of a size adapting it to receive an edge of the rim 3. In each bracket 13 is provided a slot 16 extending through both of the parallel bracket members, and bolts 17 are passed through said slots and through the rim to hold the brackets in place. The slots 16 permit the brackets 13 to be adjusted in a direction parallel with the rim, thus making it possible to regulate the tension in the springs 4, which are extended between the hooks of the brackets 10 and 13. The connection between each hook and the spring which is attached thereto is accomplished by a device 18 constructed of wire bent into the form of an approximate U, the two extremities thereof being hooked, so as to engage one end of the spring at each side thereof, the other end of the device being adapted to pass over the bracket hook.

By arranging the brackets 10 and 13 in staggered relation to each other on their respective rims, the springs are made to extend diagonally between the two rims alternating in their inclination. When the parts of the wheel are being put together after each spring has been extended between the proper pair of hooks, a considerable strain will be exerted upon the hook 14 before the same is secured to the rim 3, so as to place the spring under tension. In supporting the weight of a vehicle the greatest strain will be upon those springs which are at each side of the wheel, although all of the springs will be active in taking up some part of the strain. In transmitting rotation from the inner rim to the outer rim, or vice versa, one half of the springs will always be active and under tension, the other half being idle and unaffected by the tangential impulse. The springs which are under strain during a forward motion of the car, will be idle when the direction of the motion of the car is reversed and vice versa.

The invention is presented as including all such changes and modifications as may be included within the scope of the following claim.

What we claim is:

In a vehicle wheel, the combination with a hub, spokes and an inner rim forming a rigid frame, of a plurality of hooked brackets mounted upon said rim and adjustable longitudinally therewith, said brackets being alternately arranged adjacent to the edges of the rim, an outer rim spaced from the inner rim, a plurality of hooked brackets mounted upon the outer rim and alternately arranged adjacent to the edges of the rim, a plurality of coiled springs diagonally mounted between the two rims, and means attaching the extremities of said springs to said hooked brackets.

In testimony whereof we have signed our names to this specification in the presence of two subscribing witnesses.

ALFRED R. WYLIE.
JAMES G. WRIGHT.

Witnesses:
S. B. FLETCHER,
S. B. KENDLE.

---

Copies of this patent may be obtained for five cents each, by addressing the "Commissioner of Patents, Washington, D. C."